US006856455B2

(12) United States Patent
Naganuma et al.

(10) Patent No.: US 6,856,455 B2
(45) Date of Patent: Feb. 15, 2005

(54) LIGHT SOURCE APPARATUS, OPTICAL AMPLIFIER AND OPTICAL COMMUNICATION SYSTEM

(75) Inventors: Norihisa Naganuma, Sapporo (JP); Norifumi Shukunami, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 10/214,311

(22) Filed: Aug. 8, 2002

(65) Prior Publication Data

US 2003/0016721 A1 Jan. 23, 2003

Related U.S. Application Data

(63) Continuation of application No. 08/889,875, filed on Jul. 8, 1997, now Pat. No. 6,452,720.

(30) Foreign Application Priority Data

Jan. 29, 1997 (JP) ............................................. 09-014420

(51) Int. Cl.[7] ............................................... H01S 3/00
(52) U.S. Cl. ......................... 359/341.31; 359/341.32; 372/99; 372/102; 385/37
(58) Field of Search ..................... 359/341.31, 341.32; 372/99, 102; 385/37

(56) References Cited

U.S. PATENT DOCUMENTS

| 4,616,898 A | 10/1986 | Hicks, Jr. |
| 4,805,977 A | 2/1989 | Tamura et al. |
| 4,881,790 A | 11/1989 | Mollenauer |
| 4,923,291 A | 5/1990 | Edagawa et al. |
| 4,955,028 A | 9/1990 | Alferness et al. |
| 5,187,760 A | 2/1993 | Huber |
| 5,500,764 A | 3/1996 | Armitage et al. |
| 5,561,552 A | 10/1996 | Shibuya |
| 5,563,732 A | 10/1996 | Erdogan et al. |
| 5,570,440 A | 10/1996 | Mizrahi |
| 5,608,571 A | 3/1997 | Epworth et al. |
| 5,640,268 A | 6/1997 | Chesnoy |
| 5,647,038 A | 7/1997 | Minden et al. |
| 5,696,779 A | 12/1997 | Welch et al. |
| 5,724,377 A | 3/1998 | Huang |
| 5,760,949 A | 6/1998 | Motoshima et al. |
| 5,771,250 A | 6/1998 | Shigehara et al. |
| 5,832,011 A | 11/1998 | Kashyap |
| 6,452,720 B1 * | 9/2002 | Naganuma et al. .... 359/341.31 |

FOREIGN PATENT DOCUMENTS

| GB | 5088880 | 9/1994 |
| JP | 62-154685 | 7/1987 |
| JP | 6067126 | 3/1994 |
| JP | 7-45890 | 2/1995 |

OTHER PUBLICATIONS

Laming et al., "OSA Trends in Optics and Photonics", vol. 5, pp. 65–82 (Abstract Only).
Seaster Optics Inc., "980 nm Pump Module", 4 pages, British Colombia, Canada, 1994.
Mikkelsen et al., IEEE/Lasers and Electro–Optics Society, Technical Digest, vol. 13, pp. 192–195, Jul. 26, 1991.
Emori et al., Electron Lett., V. 34, p2145, "Multiplexed Semiconductor Pump Lasers", p. 151, Lucent Technologies.
Takenaka et al., Optical Amplifiers and Their Applications, IEEE/OSA, vol. 13, pp. 254–257, Jul. 26, 1991.
Agere systems, Raman Pump Module R18xx Platform, Preliminary Data Sheet, Oct. 2001.

* cited by examiner

Primary Examiner—Mark Hellner
(74) Attorney, Agent, or Firm—Staas & Halsey LLP

(57) ABSTRACT

An apparatus has first and second light sources, a plurality of filters, and an optical switch. The light sources output a light beam having a spectrum determined by a gain band thereof. The plurality of filters each have a reflection band included in the gain band. The optical switch selectively couples the filters to the light source. The first and second light sources provide pumping light to a single transmission line. The first and second filters are configured so as to not reflect signal light to be amplified.

13 Claims, 14 Drawing Sheets

F I G. 5
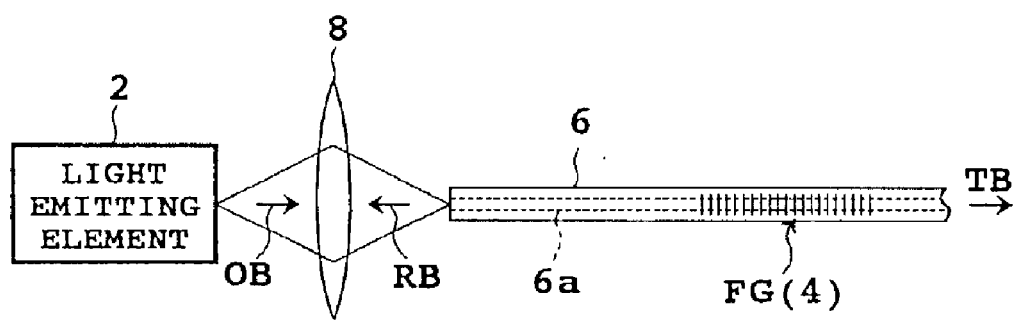
F I G. 6
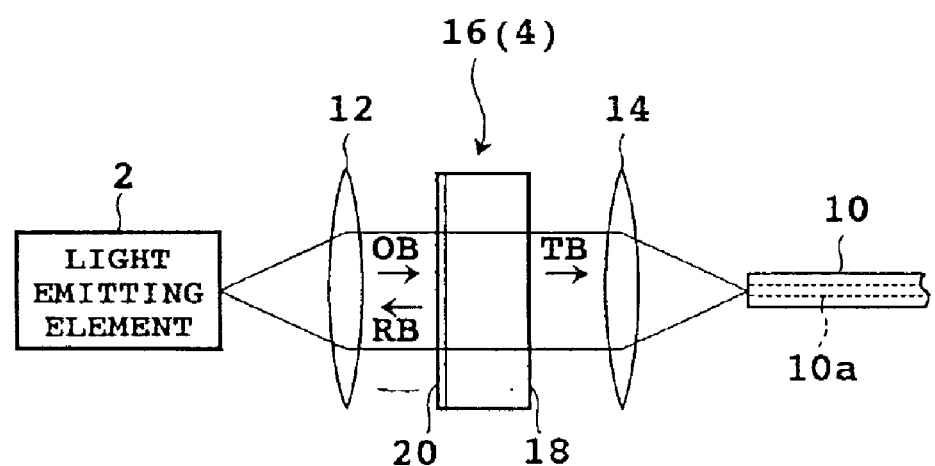

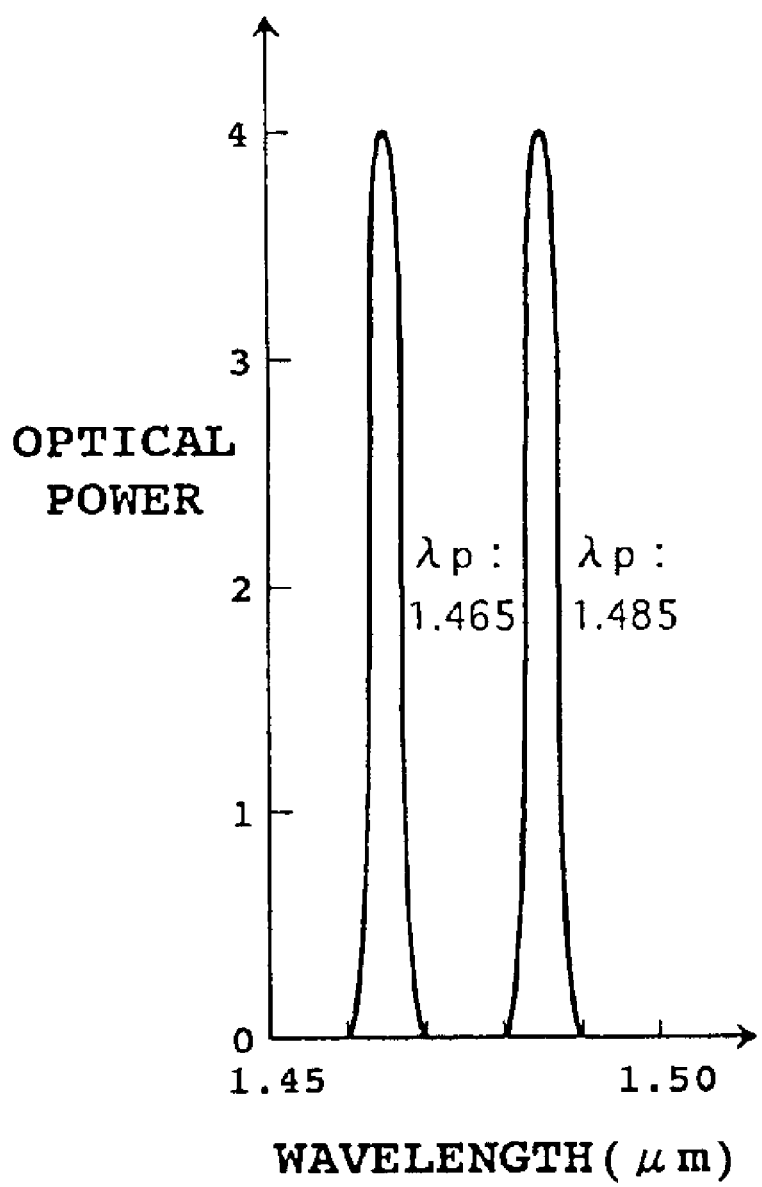

LIGHT SOURCE APPARATUS, OPTICAL AMPLIFIER AND OPTICAL COMMUNICATION SYSTEM

This application is a continuation of application Ser. No. 08/889,875, filed Jul. 8, 1997 now U.S. Pat. No. 6,452,720, now allowed.

BACKGROUND OF THE INVENTION

1. Field of the Invention

This invention relates generally to application of light emitting elements such as light emitting diodes and laser diodes to evaluation of optical devices, amplification of optical signals, and optical communication, and more specifically to a light source apparatus suitable for production of pump light for an optical amplifier or for evaluation of a passive optical device as well as an optical amplifier and an optical communication system which includes a light source apparatus of the type just mentioned.

2. Description of the Related Art

As a result of establishment of a technology for production of silica fibers of a low loss (for example, 0.2 dB/km), an optical communication system which includes an optical fiber as a transmission line has been put into practical use. The optical communication system includes a first terminal station having an optical transmitter which outputs an optical signal, an optical fiber transmission line for transmitting the optical signal, and a second terminal station having an optical receiver which receives the optical signal transmitted thereto by the optical fiber transmission line.

In order to compensate for a loss in an optical fiber transmission line, one or more optical repeaters each having an optical amplifier for amplifying an optical signal are interposed intermediately in the optical fiber transmission line. The optical amplifier includes an optical amplification medium to which an optical signal is supplied, and means for pumping (exciting) the optical amplification medium so that the optical amplification medium may have an amplification band which includes a wavelength of the optical signal. For example, an erbium doped fiber amplifier (EDFA) for amplifying an optical signal of the wavelength band of 1.55 $\mu$m includes a doped fiber doped with erbium (Er) and having a first end and a second end, and a pump light source for supplying pump light to the doped fiber through at least one of the first and second ends. When an optical signal to be amplified is supplied to the doped fiber through the first end, then the optical signal is amplified in the doped fiber in accordance with the principle of stimulated emission, and the amplified optical signal is outputted through the second end.

Since an EDFA requires a pump light source for pumping a doped fiber in this manner, an electronic circuit for supplying power to the pump light source is provided additionally for the EDFA. On the other hand, where an optical fiber transmission line is laid on the bottom of the sea, since an optical repeater having the EDFA must be kept sunk on the bottom of the sea, maintenance of the optical repeater is very difficult. Accordingly, it is required for an optical fiber communication system which includes an EDFA that the maintenance be easy.

As a pump light source for an optical amplifier, a light emitting element such as a light emitting diode or a laser diode is used. In order to raise the optical power outputted from an optical amplifier, the maximum optical power of pump light to be supplied to a doped fiber should be raised. Since the output optical power of one light emitting element is limited, in order to obtain a higher optical power, two light emitting elements which output first pump light and second pump light having different wavelengths from each other are used and the first pump light and the second pump light are wavelength division multiplexed.

For example, in order to effect wavelength division multiplexing in a pump band of the 1.48 $\mu$m wavelength band (1.45 $\mu$m to 1.50 $\mu$m) which is adopted by the EDFA, a spectrum width of approximately 20 nm is required for each of the first pump light and the second pump light, and the dispersion of the center wavelength must be restricted to approximately ±5 nm. However, the spectrum of a light emitting element is liable to be dispersed due to an error in production or the like, and there is a problem that the yield of light emitting elements which can be used for wavelength division multiplexing is low.

Incidentally, in order to evaluate a passive optical device represented by an optical multiplexer which is used for wavelength division multiplexing, a light source apparatus for obtaining a beam of light having a desired center wavelength is required. While a variable wavelength light source is known as one of light source apparatus of the type mentioned, the variable wavelength light source has a problem in that it is expensive. Further, while it may be proposed to apply a band-pass filter to a beam of light outputted from a light emitting diode having a comparatively broad spectrum to obtain a beam of light having a center wavelength necessary for measurement, since the beam of light obtained in this instance is reduced in power, the dynamic range in measurement is decreased.

It is to be noted that, as a technique which seems to pertain to the light source apparatus of the present application, an apparatus disclosed in Japanese Patent Laid-Open Application No. Heisei 7-45890 or Japanese Patent Laid-Open Application No. Showa 62-154685 is known. The former discloses an external resonator type semiconductor laser wherein an external resonator for a semiconductor laser is formed using a diffraction grating and driving current for the semiconductor laser is controlled in accordance with diffracted light from the diffraction grating. The latter discloses a light source for wavelength multiplex communication wherein a single common diffraction grating is applied to a plurality of semiconductor lasers.

SUMMARY OF THE INVENTION

Accordingly, it is an object of the present invention to provide a light source apparatus which can produce a beam of light having a desired center wavelength irrespective of a spectrum of a light emitting element.

It is another object of the present invention to provide a light source apparatus which can produce a beam of light having a maximum power higher than the maximum power of a beam of light outputted from a light emitting element.

It is a further object of the present invention to provide an optical amplifier which provides a high output optical power.

It is a still further object of the present invention to provide an optical fiber communication system wherein a loss in an optical fiber transmission line can be compensated for and the maintenance is easy.

According to an aspect of the present invention, there is provided a light source apparatus which includes a light emitting element having a gain band and a band-reflection filter optically connected to the light emitting element. The light emitting element outputs a light beam having a spectrum which is determined by the gain band. The band-reflection filter produces, from the light beam outputted from the light emitting element, a transmission beam and a reflection beam which returns to the light emitting element. The band-reflection filter has a reflection band included in the gain band of the light emitting element and narrower than the gain band, and the transmission beam of the band-reflection filter has a maximum power higher than the maximum power of the light beam to be outputted from the light emitting element.

With the construction, pump light having a maximum power higher than the maximum power of the light to be outputted from the light emitting element can be obtained, and one of the objects of the present invention is attained. Further, since the center wavelength of the light beam to be obtained is determined by the reflection band of the band reflection filter, even if the gain band or spectrum of the light emitting element has some dispersion, a light beam having a desired center frequency can be obtained as far as the reflection band is included in the range of the dispersion, and another one of the objects of the present invention is attained.

According to another aspect of the present invention, there is provided an optical amplifier which comprises an optical amplification medium to which a signal light beam is supplied, and means for pumping the optical amplification medium so that the optical amplification medium may have an amplification band including a wavelength of the signal light beam. The means for pumping includes a light emitting element having a gain band and a band-reflection filter optically connected to the light emitting element. The light emitting element outputs a light beam having a spectrum which is determined by the gain band. The band reflection filter produces, from the light beam outputted from the light emitting element, a transmission beam and a reflection beam which returns to the light emitting element. Then, the transmission beam is supplied to the optical amplification medium.

With the construction, as the reflection beam from the band-reflection filter returns to the light emitting element which has the gain band, the power of the reflection beam is increased, and pump light of a higher power can be obtained. Consequently, an optical amplifier having a high output optical power can be provided.

According to a further aspect of the present invention, there is provided an optical communication system which comprises a first terminal station including an optical transmitter for outputting an optical signal, an optical fiber transmission line for transmitting the optical signal, and a second terminal station including an optical receiver for receiving the optical signal transmitted by the optical fiber transmission line. The optical fiber transmission line includes, at least at a portion in the longitudinal direction thereof, a doped fiber doped with a rare earth element. At least one of the first and second terminal stations further includes means for pumping the doped fiber so that the doped fiber may have an amplification band which includes a wavelength of the optical signal. The means for pumping includes a light emitting element having a gain band and a band reflection filter optically connected to the light emitting element. The light emitting element outputs a light beam having a spectrum which is determined by the gain band. The band reflection filter produces, from the light beam outputted from the light emitting element, a transmission beam and a reflection beam which returns to the light emitting element. Then, the transmission beam is supplied to the doped fiber.

With the construction, since a light emitting element and an electronic circuit for driving the light emitting element can be provided in the first or second terminal station, maintenance is facilitated. Further, since the optical fiber transmission line includes a doped fiber, compensation for the loss in the optical fiber transmission line can be achieved.

The above and other objects, features and advantages of the present invention and the manner of realizing them will become more apparent, and the invention itself will best be understood, from a study of the following description and appended claims with reference to the attached drawings showing some preferred embodiments of the present invention.

BRIEF DESCRIPTION OF THE DRAWINGS

FIG. 5 is a schematic view showing a first embodiment of a light source apparatus according to the present invention;

FIG. 6 is a schematic view showing a second embodiment of a light source apparatus according to the present invention;

FIG. 14 is a diagram illustrating a spectrum of an output beam of the light source apparatus of FIG. 10;

DESCRIPTION OF THE PREFERRED EMBODIMENTS

In the following, preferred embodiments of the present invention are described in detail with reference to the accompanying drawings. Substantially same elements are denoted by same reference symbols all through the figures.

Figure 1:
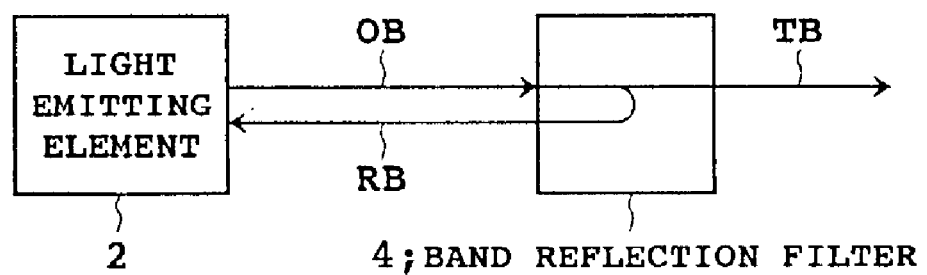
FIG. 1 is a block diagram showing a basic construction of a light source apparatus according to the present invention.

FIG. 1 is a block diagram showing a basic construction of the light source apparatus according to the present invention.

The light source apparatus shown includes a light emitting element 2 and a band-reflection filter 4. The light emitting element 2 outputs a light beam OB. The band reflection filter 4 receives the light beam OB and divides the light beam OB into a transmission beam TB which passes through the filter 4 and a reflection beam RB which is reflected by the filter 4 and returns to the light emitting element 2.

For the light emitting element 2, a light emitting diode or a laser diode can be used. Where a light emitting diode is used, a gain band is produced by injection of current into the light emitting diode in accordance with the principle of spontaneous emission, and a light beam OB having a spectrum determined by the gain band is outputted from the light emitting diode. Where a laser diode is used, a gain band is produced by injection of current into the laser diode in accordance with the principle of stimulated emission, and a light beam OB having a spectrum determined by the gain band is obtained. In this instance, the gain band is defined, for example, by a wavelength range in which a predetermined gain is produced with light confined in an active layer of the laser diode.

Figure 2A:
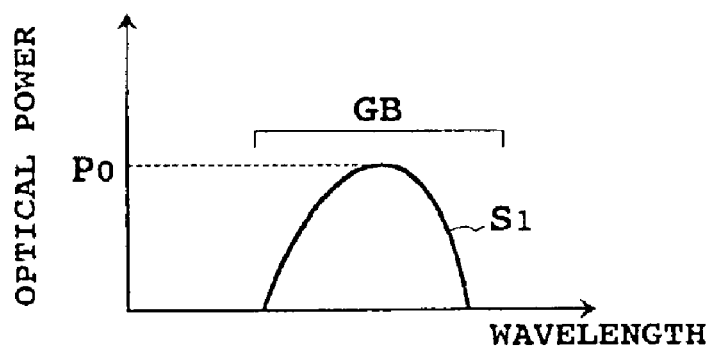
FIGS. 2A, 2B and 2C are diagrams illustrating operation of the light source apparatus of FIG. 1.

Operation of the light source apparatus of FIG. 1 is described with reference to FIGS. 2A, 2B and 2C. As shown in FIG. 2A, the light emitting element 2 has a gain band GB, and the spectrum S1 of the light beam OB is determined by the gain band GB. More particularly, the shortest wavelength and the longest wavelength which provide the opposite ends of the spectrum S1 are included in the gain band GB. In the example shown, the wavelength of the spectrum S1 at which a maximum power P0 is provided is positioned substantially at the center of the gain band GB.

Figure 2B:
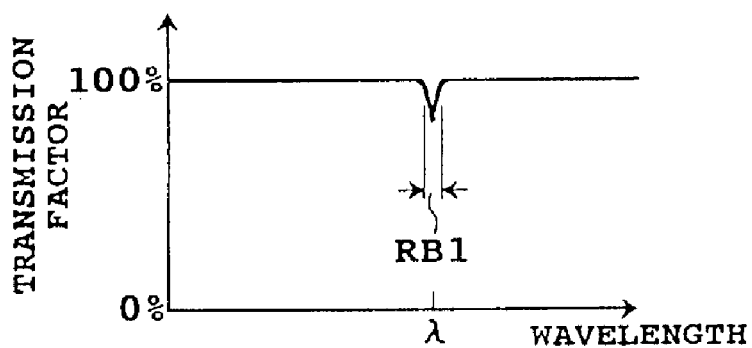

The band-reflection filter 4 has a reflection band RB1 as shown in FIG. 2B. The reflection band RB1 is included in the gain band GB and narrower than the gain band GB. In any other range than the reflection band RB1, the transmission factor of the band-reflection filter 4 is substantially 100%, but in the reflection band RB1, the transmission factor drops up to a minimum transmission factor (for example, 95%). The wavelength $\lambda$ which provides the minimum transmission factor is set to a value equal to or in the proximity of a wavelength of the spectrum S1 (refer to FIG. 2A) which provides the maximum power P0.

Figure 2C:
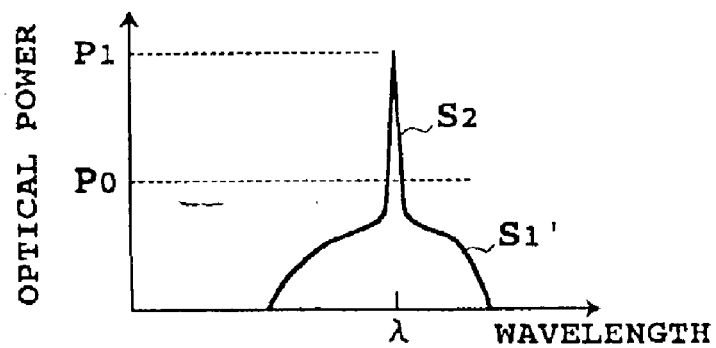

Referring to FIG. 2C, there is shown a spectrum of the transmission beam TB which has passed through the band reflection filter 4. The spectrum shown has such a shape that a sharp spectrum S2 is superposed on a moderate spectrum S1' which is a rather reduced form of the spectrum S1 shown in FIG. 2A. The spectrum S2 arises from the existence of the reflection band RB1, and the wavelength of the spectrum S2 which provides a maximum power P1 is substantially equal to $\lambda$. The reason why the maximum power P1 of the spectrum S2 is higher than the maximum power P0 of the spectrum S1 in this manner is that the light emitting element 2 has the gain band GB and the reflection beam RB which has a power and wavelength components determined by the reflection band RB1 returns to the light emitting element 2.

In order to raise the gain of the reflection beam RB, an optical resonator structure for the reflection beam RB may be formed. An end of the optical resonator structure is provided by the band-reflection filter 4 while the other end is provided, where, for example, a light emitting element has first and second end surfaces (cleavage or facet planes), by the first end surface. The second end surface is located on the band reflection filter 4 side.

In this manner, with the basic construction of the light source apparatus of FIG. 1, a transmission beam TB having a maximum power P1 higher than the maximum power P0 of the light beam OB outputted from the light emitting element 2 can be obtained.

Further, since the wavelength $\lambda$ which provides the maximum power P1 of the transmission beam TB is determined by the center wavelength of the reflection band RB1 as far as the reflection band RB1 is included between the shortest wavelength and the longest wavelength of the spectrum S1, a light beam (transmission beam TB) having a desired center wavelength irrespective of the spectrum S1 of the light emitting element 2 can be obtained by designing or adjustment of the characteristics of the band reflection filter 4.

Figure 3:
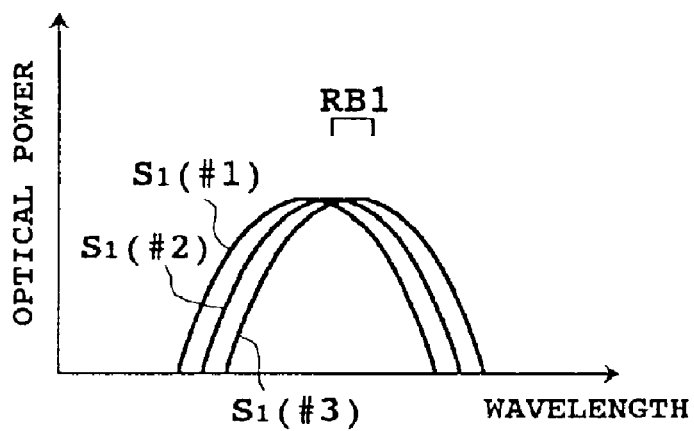
FIG. 3 is a diagram illustrating a dispersion of a spectrum of a light emitting element.

For example, when three light emitting elements are given, they sometimes have spectra S1(#1, #2 and #3) which are displaced a little from each other in a wavelength axis direction as seen in FIG. 3. The present invention is effective for such a dispersion in characteristic. In particular, by setting the reflection band RB1 of the band reflection filter 4 substantially to the center in a portion in which the three spectra S1(#1, #2 and #3) overlap each other, the wavelength $\lambda$ which provides the maximum power P1 of the steep spectrum S2 (refer to FIG. 2C) can be made coincide among the light emitting elements. Effective utilization of this operation will be hereinafter described.

Figure 4:
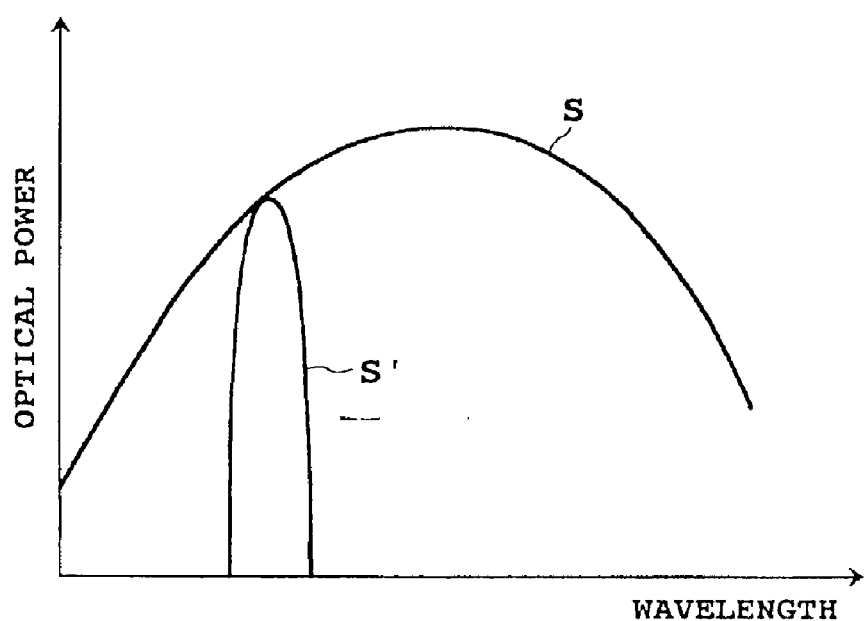
FIG. 4 is a diagram illustrating a characteristic of a conventional light source apparatus having a band-pass filter.

Referring to FIG. 4, there is shown a characteristic of a conventional light source apparatus which includes a combination of a light emitting element and a band-pass filter. When a spectrum S of a beam of light outputted from the light emitting element is given, since the band-pass filter has a pass band, the spectrum S' of the beam of light having passed through the filter is narrowed corresponding to the pass-band. However, since the beam of light having passed through the filter never returns to the light emitting element in principle, the maximum power of the beam of light does not exhibit any increase. Accordingly, the optical power is decreased by an amount as much as the spectrum is narrowed by the pass band.

In contrast, with the basic construction of the light source apparatus of FIG. 1 according to the present invention, since a gain in the light emitting element 2 is produced with the reflection beam RB from the band reflection filter 4, an optical output of a high power can be obtained.

It is to be noted that the lowest transmission factor of the reflection band RB1 of the band reflection filter 4 is preferably higher than 50% but lower than 98% since, if it is excessively low, then light obtained by resonance cannot be extracted, but if it is excessively high, then a reflection beam RB for resonance cannot be obtained sufficiently.

Generally, when the refractive index of an optical medium (for examples glass) varies permanently by irradiation of light, the optical medium is called photosensitive. Making use of this property, a fiber grating can be produced in the core of an optical fiber. Such fiber grating is characterized in that it Bragg reflects light in a narrow band in the proximity of a resonance wavelength determined by the pitch of the grating and the effective refractive index of the fiber mode. The fiber grating is produced, for example, by irradiating to a fiber an excimer laser whose oscillation frequency is 248 nm or 193 nm using a phase mask. The photosensitivity unique to an optical fiber can be reinforced, for example, by $H_2$ loading, frame brushing or irradiation of a large amount of ultraviolet rays. Accordingly, the band reflection filter 4 of FIG. 1 can be provided using a fiber grating. Details are described below.

FIG. 5 is a diagrammatic view showing a first embodiment of the light source apparatus according to the present invention. A light emitting element 2 and an optical fiber 6 are optically connected to each other by a lens 8. A fiber grating FG as the band-reflection filter 4 is formed intermediately or at an end of the optical fiber 6. A light beam OB outputted from the light emitting element 2 is converged by the lens 8 and introduced into a core 6a of the optical fiber 6 through an end surface of the same. Part of the light beam OB supplied to the optical fiber 6 is Bragg reflected by the fiber grating FG and outputted as a reflection beam RB from the end surface of the core 6a. The reflection beam RB outputted from the optical fiber 6 is converged by the lens 8 and introduced into the light emitting element 2. A transmission beam TB which has passed through the fiber grating FG is used as an optical output of the light source apparatus to various applications.

In the present embodiment, since the fiber grating FG is adopted as the band-reflection filter 4 and the fiber grating FG can be formed directly in a waveguide structure of the optical fiber 6 including the core 6a, the loss of the transmission beam TB with respect to the light beam OB outputted from the light emitting element 2 can be suppressed low. As the loss of the transmission beam TB from the light beam OB is suppressed low, the optical output of the light source apparatus can be increased.

Referring to FIG. 6, there is shown a second embodiment of the light source apparatus of the present invention. In order to optically connect a light emitting element 2 and an optical fiber 10 to each other by means of a collimate beam system, lenses 12 and 14 are interposed in this order between the light emitting element 2 and the optical fiber 10. Here, the band reflection filter 4 is a dielectric multi-layer film filter 16 interposed between the lenses 12 and 14. The filter 16 includes a transparent substrate 18 made of glass or the like, and a dielectric multi-layer film 20 formed on the transparent substrate 18. The dielectric multi-layer film 20 is obtained, for example, by forming $SiO_2$ layers of a low refractive index and $TiO_2$ layers of a high refractive index layered alternately so that it has totaling several to several tens layers. The dielectric multi-layer film 20 is disposed perpendicularly to a collimate beam between the lenses 12 and 14 in order to secure a necessary coupling efficiency of the reflection beam RB to the light emitting element 2.

An light beam OB outputted from the light emitting element 2 is collimated by the lens 12 and then divided by the dielectric multi-layer film 20 into a reflection beam RB which is reflected from the dielectric multi-layer film 20 and a transmission beam TB which passes through the dielectric multi-layer film 20. The transmission beam TB is converged by the lens 14 and enters the optical fiber 10 through an end surface of the core 10a of the optical fiber 10. The reflection beam RB is converged by the lens 12 and enters the light emitting element 2.

In the present embodiment, since the dielectric multi-layer film filter 16 is used as the band-reflection filter 4, the reflection characteristic of the band reflection filter 4 can be designed readily by adjusting the thicknesses of the layers or the layer construction of the dielectric multi-layer film 20.

Figure 7:
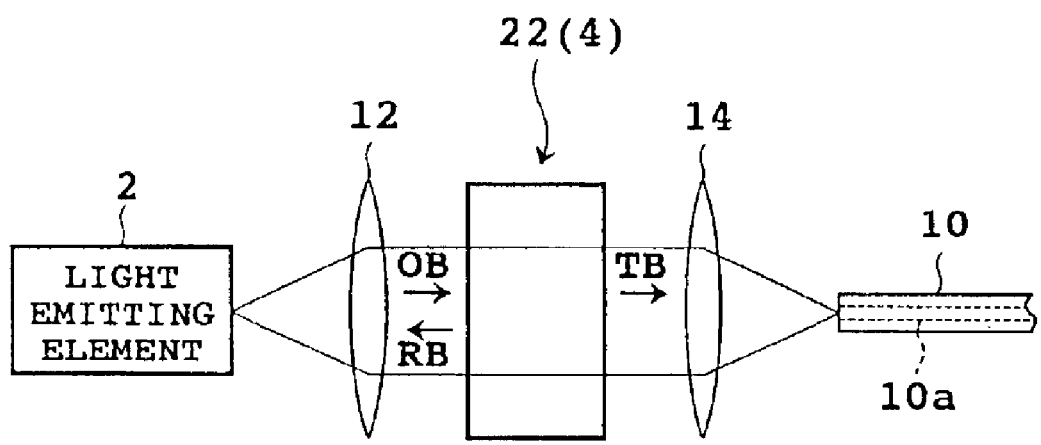
FIG. 7 is a schematic view showing a third embodiment of a light source apparatus according to the present invention.

FIG. 7 is a schematic view showing a third embodiment of the light source apparatus according to the present invention. Here, an etalon plate 22 substituted for the dielectric multi-layer film filter 16 of FIG. 6 is used as the band-reflection filter 4. The material of the etalon plate 22 is, for example, quartz, and the etalon plate 22 has two surfaces parallel to each other. Each of the two surfaces is set perpendicularly to a collimate beam between the lenses 12 and 14 in order to secure a necessary coupling efficiency of the reflection beam RB to the light emitting element 2.

Where the etalon plate 22 is used as the band reflection filter 4, the center wavelength λ of the reflection band RB1 illustrated in FIG. 2B can be adjusted by the thickness of the etalon plate 22, and the values of the finesse, which represents the sharpness of the drop of the transmission factor in the proximity of the wavelength λ, and the lowest transmission factor can be adjusted by the reflection factors of the two surfaces. Since production of the etalon plate 22 is easy, according to the present embodiment, a desired characteristic of the band reflection filter 4 can be obtained readily.

With the basic construction of the light source apparatus shown in FIG. 1 and the first to third embodiments described above which are embodiments of the light source apparatus, since a beam of light having a desired center wavelength irrespective of the spectrum of a light emitting element can be obtained, the light source apparatus can be used for evaluation of passive optical devices, and the necessity for use of a variable wavelength light source as in the prior art is eliminated. Further, reduction of a dynamic range in measurement which arises from such a reason as described hereinabove with reference to FIG. 4 does not occur.

Further, since a beam of light having a maximum power higher than the maximum power of a beam of light outputted from a light emitting element can be obtained, where the beam of light is used as pump light for an optical amplifier, the output light power of the optical amplifier can be increased. In this instance, in order to obtain pump light of a high power, a laser diode is preferably used as the light emitting element. For example, where the present invention is applied to an EDFA for amplifying an optical signal of the 1.55 μm wavelength band, the oscillation wavelength of the laser diode is set to a value in the proximity of 1.48 μm, and the reflection band of the band reflection filter is set so that it may be included within the range of, for example, 1.45 μm to 1.50 μm. By this means, a sufficient gain of the EDFA can be obtained.

Where the light source apparatus of the present invention is applied to evaluation of a passive optical device, in order to assure a broad variation range of the wavelength which provides a maximum power of a beam of light to be obtained, a light emitting diode having a broad gain band or spectrum is suitably used as the light emitting element. Such variation of the wavelength can be achieved, for example, by using a plurality of fiber gratings for the band-reflecting filter and additionally adopting an optical switch for selectively connecting the fiber gratings to the light emitting element. Details are described below.

Figure 8:
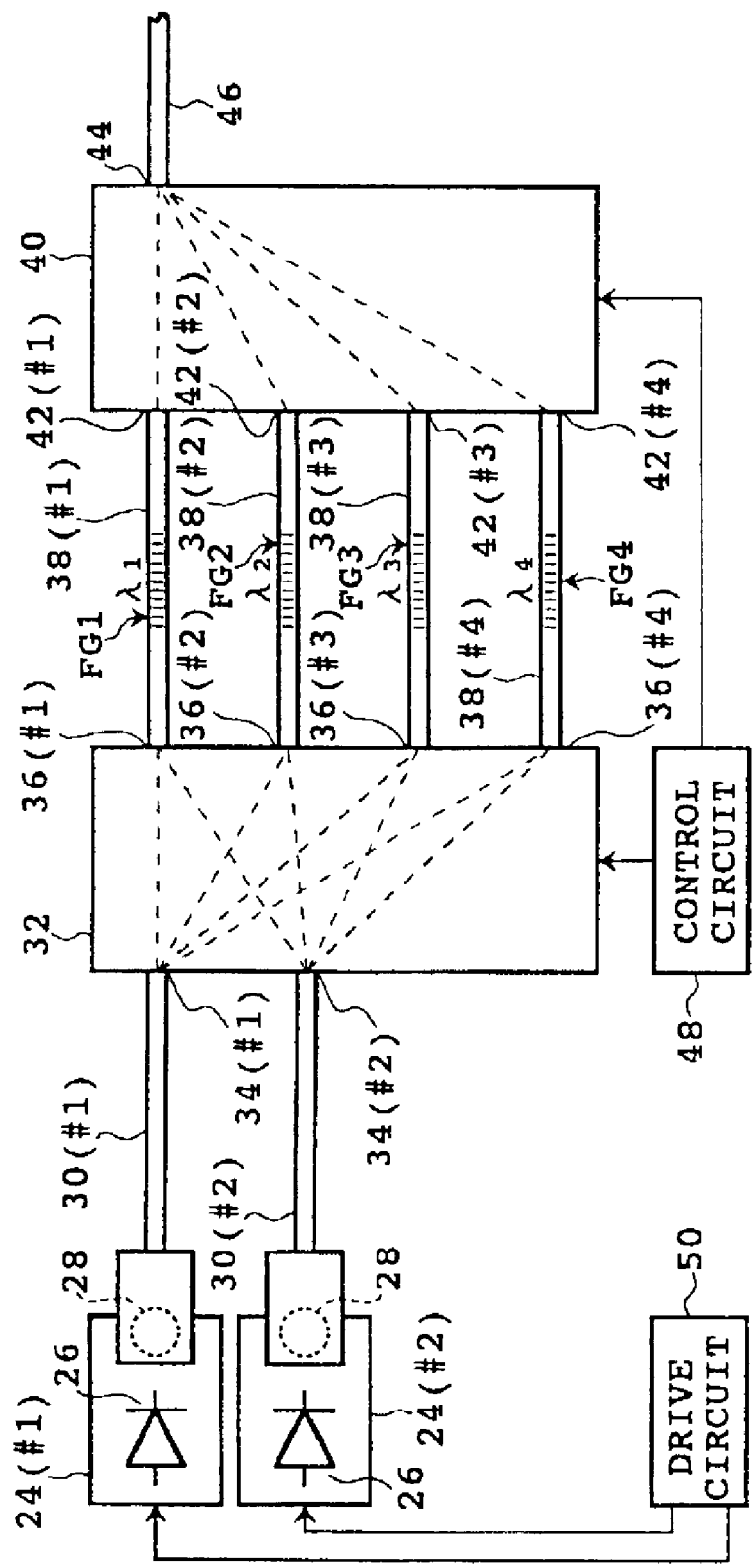
FIG. 8 is a schematic view showing a fourth embodiment of a light source apparatus according to the present invention.

FIG. 8 is a block diagram showing a fourth embodiment of the light source apparatus according to the present invention. The light source apparatus shown includes a light emitting element unit 24(#1) and a spare light emitting element unit 24(#2) for assuring redundancy. Each of the units 24(#1 and #2 ) includes an end surface emitting type light emitting diode (EE-LED) 26 as a light emitting element. It is to be noted that the end surface emitting type light emitting diode is sometimes called superluminescence diode.

The EE-LED 26 of the unit 24(#1) is optically connected to a first end of an optical fiber 30(#1) by a corresponding lens 28. The EE-LED 26 of the unit 24(#2) is optically connected to a first end of another optical fiber 30(#2) by a corresponding lens 28. The second ends of the optical fibers 30(#1 and #2 ) are connected to input ports 34(#1 and #2 ) of a 2×4 optical switch 32, respectively. Output ports 36(#1, #2, #3 and #4) of the optical switch 32 are connected to first ends of optical fibers 38(#1, #2, #3 and #4), respectively.

Second ends of the optical fibers 38(#1, #2, #3 and #4) are connected to input ports 42(#1, #2, #3 and #4) of a 4×1 optical switch 40, respectively.

Fiber grating FG1, FG2, FG3 and FG4 are formed intermediately of the optical fibers 38(#1, #2, #3 and #4), respectively. The Bragg reflection wavelengths of the fiber grating FG1, FG2, FG3 and FG4 are set to $\lambda_1, \lambda_2, \lambda_3$ and $\lambda_4$, respectively. An output port 44 of the optical switch 40 is connected to an optical fiber 46 to be used as an output of the light source apparatus. The optical switches 32 and 40 are controlled by a control circuit 48, and bias current from a driver circuit 50 is supplied to the EE-LED 26 of each of the light emitting element units 24(#1 and #2 ).

Now, operation of the light source apparatus when bias current is supplied only to the EE-LED 26 of the unit 24(#1) is described. The optical switch 32 exhibits a pass state between one port selected from the four output ports 36(#1, #2, #3 and #4) and the input port 34(#1), and exhibits an interruption state between any other output port and the input port 34(#1). The selection of one of the output ports is performed by the control circuit 48. The optical switches 32 and 40 are controlled in a synchronized relationship with each other by the control circuit 48. In particular, when the output port 36(#1) of the optical switch 32 is selected, the input port 42(#1) of the optical switch 40 is selected; when the output port 36(#2) is selected, the input port 42(#2) is selected; when the output port 36(#3) is selected, the input port 42(#3) is selected; and when the output port 36(#4) is selected, the input port 42(#4) is selected. The optical switch 40 exhibits a pass state between one input port selected from the four input ports 42(#1, #2, #3 and #4) and the output port 44, but exhibits an interruption state between any other input port and the output port 44. Here, it is assumed that the ports 36(#1) and 42(#1) are selected and the fiber grating FG1 functions as a band reflection filter.

Figure 9A:
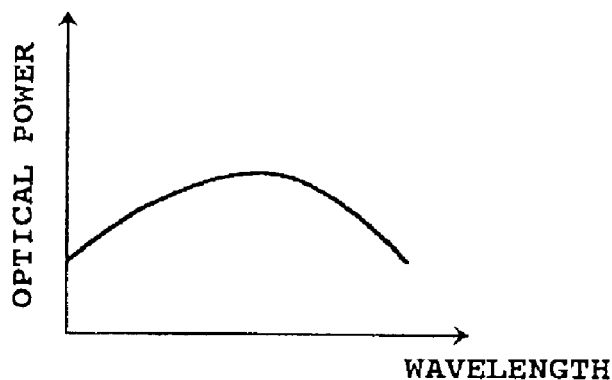
FIGS. 9A, 9B and 9C are diagrams illustrating operation of the light source apparatus of FIG. 8.
Figure 9B:
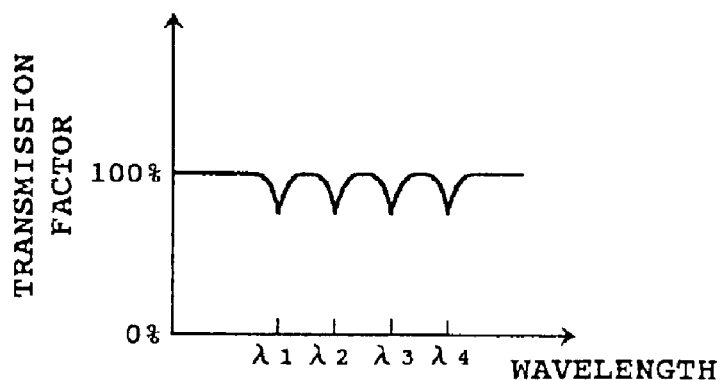

Referring to FIG. 9A, there is shown a spectrum of a beam of light outputted from an EE-LED 26. The shortest wavelength and the longest wavelength of the spectrum are, for example, 1.48 μm and 1.62 μm, respectively, and this range is sufficiently broad in order to effect evaluation of passive optical devices. Referring to FIG. 9B, there are illustrated wavelength dependencies of the transmission factors of the fiber gratings FG1, FG2, FG3 and FG4. The full width at half maximum of each of drop peaks corresponding to the reflection bands is, for example, 0.5 nm, and the lowest transmission factor in each reflection band is, for example, 70%. Here, the Bragg reflection wavelengths $\lambda_1, \lambda_2, \lambda_3$ and $\lambda_4$ of them are all included in the gain band of the EE-LED 26 and satisfy the following inequality:

$$\lambda_1 < \lambda_2 < \lambda_3 < \lambda_4$$

Figure 9C:
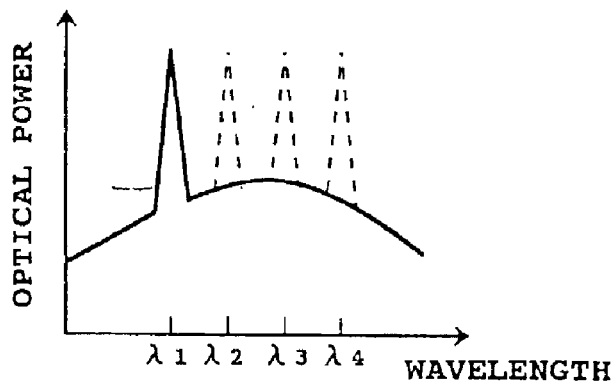

Since the fiber grating FG1 is selected, the spectrum of a beam of light (transmission beam) obtained has a spectrum peak at the wavelength $\lambda_1$ as seen in FIG. 9C. Also, by switching the selection of the optical switches 32 and 40 by means of the control circuit 48, an optical beam having a spectrum peak at the wavelength $\lambda_2, \lambda_3$ or $\lambda_4$ can be obtained.

If the unit 24(#1) fails and the unit 24(#2) is put into-an operating state, then the input port of the optical switch 32 is switched from the input port 34(#1) to the input port 34(#2) by the control circuit 48. Operation in this instance is similar to that when the unit 24(#1) is selected, and accordingly, overlapping description of the operation is omitted to avoid redundancy.

As described above, according to the embodiment shown in FIG. 8, since a plurality of fiber gratings are used and the fiber gratings are selectively connected to a light emitting element, a beam of light having a spectrum peat at a desired center wavelength can be obtained. Further, where an EE-LED is used for the light emitting element, the variation range of the center wavelength of the spectrum peak can be increased, and the light source apparatus according to the present invention can be utilized efficiently for evaluation of passive optical devices.

Incidentally, when it is intended to obtain high power pump light for an optical amplifier, it is effective to apply wavelength division multiplexing. In particular, a plurality of laser diodes which oscillate with wavelengths different from each other are used and a plurality of fiber gratings are used corresponding to the laser diodes, and transmission beams having passed through the fiber gratings are wavelength division multiplexed by means of an optical multiplexer formed from, for example, a wavelength division multiplexing (WDM) coupler. Or, in order to attain the same object, also polarization coupling is effective. For example, where a plurality of laser diodes are classified into a first group corresponding to a first polarization plane and a second group corresponding to a second polarization plane perpendicular to the first polarization plane, at least one polarizing beam splitter for coupling the first polarization plane and the second polarization plane is used. By combination of wavelength division multiplexing and polarization coupling, further increase in power of a beam of light to be obtained can be achieved. Details are described below.

Figure 10:
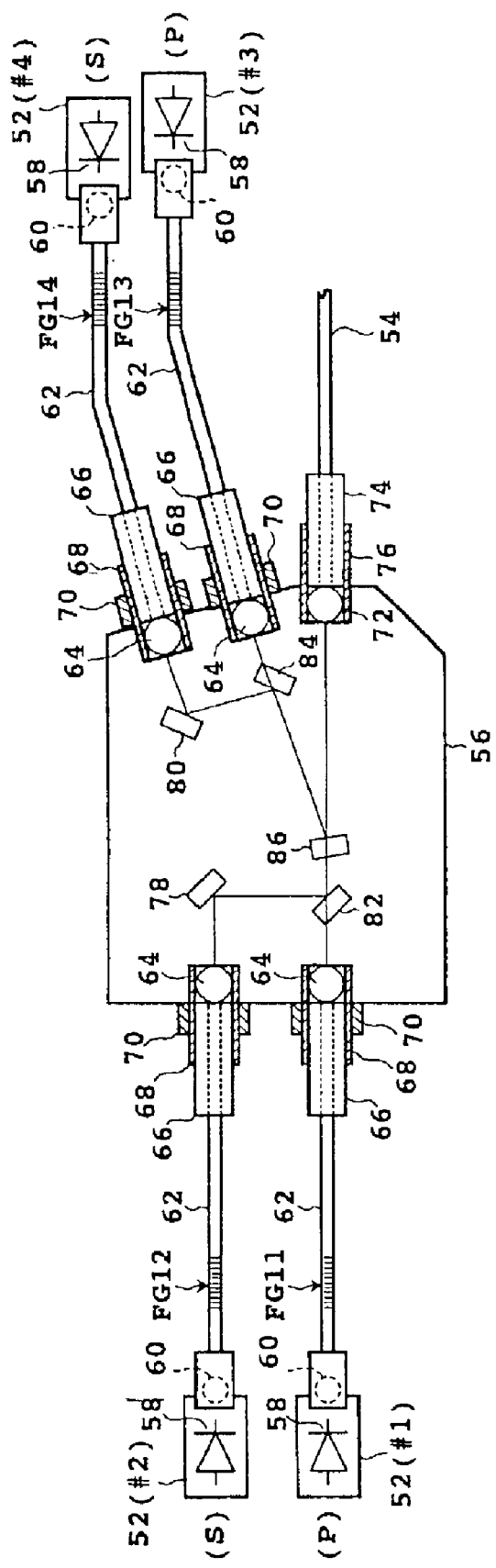
FIG. 10 is a schematic view showing a fifth embodiment of a light source apparatus according to the present invention.

FIG. 10 is a schematic view showing a fifth embodiment of the light source apparatus according to the present invention. The light source apparatus shown includes four light emitting element units 52(#1, #2, #3 and #4) and a coupling unit 56 for coupling the units to an outputting optical fiber 54. Each of the units 52(#1, #2, #3 and #4) has a laser diode 58 as a light emitting element. For each of the laser diodes 58, a laser diode of the Fabry-Perot type or of the distribution feedback (DFB) type can be used. Each of the laser diodes 58 is optically coupled to an optical system in the inside of the coupling unit 56 by means of a lens 60, a polarization maintaining fiber (PMF) 62 and another lens 64.

Each of the PMFs 62 is inserted in and secured to a ferule 66, and the ferule 66 and the lens 64 are inserted in and secured to a sleeve 68 which is in turn secured to a housing of the coupling unit 56 by means of a ring 70. Further, a lens 72 is provided in order to optically couple the outputting optical fiber 54 to the optical system in the inside of the coupling unit 56. The optical fiber 54 is inserted in and secured to a ferule 74, and the ferule 74 and the lens 72 are inserted in and secured to a sleeve 76. The sleeve 76 is secured to the housing of the coupling unit 56. The PMFs 62 have fiber gratings FG11, FG12, FG13 and FG14 formed thereon corresponding to the units 52(#1, #2, #3 and #4), respectively. Each of the laser diodes 58 of the unit§52(#1 and #3) outputs a beam of light having a P polarization plane substantially parallel to the plane of FIG. 10 while each of the laser diodes 58 of the units 52(#2 and #4) outputs a beam of light having an S polarization plane substantially perpendicular to the plane of FIG. 10.

The coupling unit 56 includes a pair of mirrors 78 and 80 and a pair of polarizing beam splitters (PBSs) 82 and 84 arranged in a predetermined positional relationship, and a WDM coupler 86. A beam of light obtained by the unit 52(#1) and the fiber grating FG11 passes through the PBS 82 and the WDM coupler 86 in this order and is coupled to the optical fiber 54. Another beam of light obtained by the unit 52(#2) and the fiber grating FG12 is reflected by the mirror 78 and the PBS 82 in this order, passes through the WDM coupler 86 and is coupled to the optical fiber 54. A further beam of light obtained by the unit 52(#3) and the fiber grating FG13 passes through the PBS 84 and is reflected by the WDM coupler 86, whereafter it is coupled to the optical fiber 54. A still further beam of light obtained by the unit 52(#4) and the fiber grating FG14 is reflected by the mirror 80, PBS 84 and WDM coupler 86 in this order and coupled to the optical fiber 54.

Figure 11A:
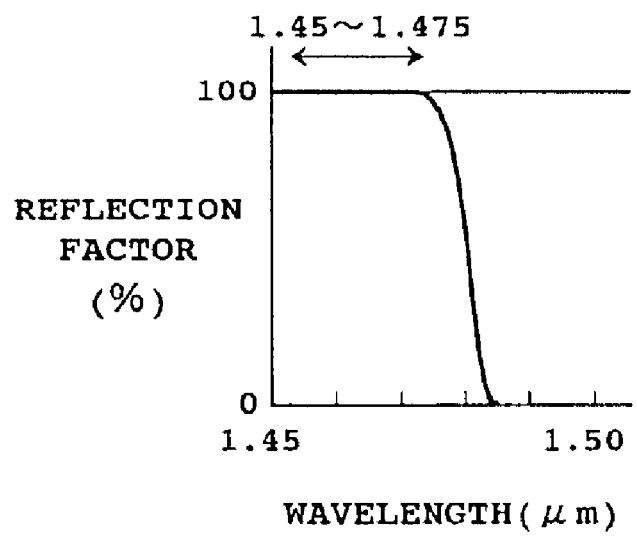
FIGS. 11A and 11B are diagrams illustrating characteristics of a WDM coupler of FIG. 10.
Figure 11B:
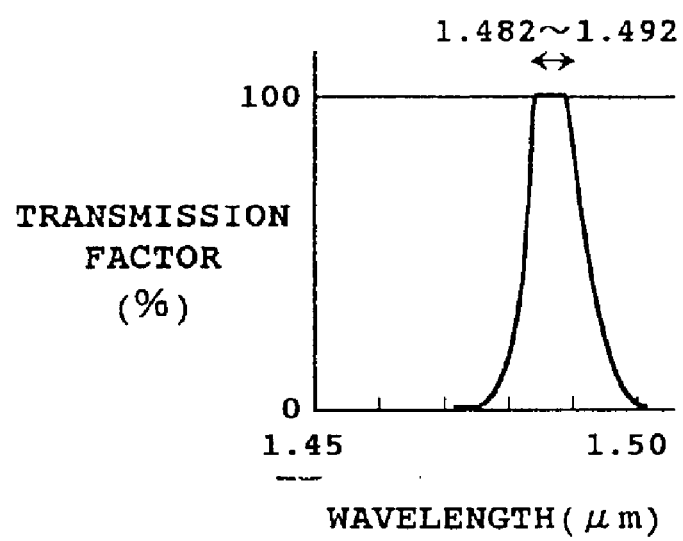

Characteristics of the WDM coupler 86 shown in FIG. 10 are described with reference to FIGS. 11A and 11B. Referring to FIG. 11A, there is illustrated a relationship between the reflection factor (%) and the wavelength ($\mu$m) of the WDM coupler 86. In the range of the wavelength from 1.45 $\mu$m to 1.475 $\mu$m, the reflection factor is substantially 100%, but for any other longer wavelength, the reflection factor is substantially 0. Referring to FIG. 11B, there is illustrated a relationship between the transmission factor (%) and the wavelength ($\mu$m) of the WDM coupler 86. In the range of the wavelength from 1.482 $\mu$m to 1.492 $\mu$m, the transmission factor is substantially 100%, but for any other wavelength, the transmission factor is substantially 0.

Accordingly, in order to allow the light source apparatus of FIG. 10 to operate effectively, it is required that the wavelengths of beams of light from the units 52(#1 and #2) be included within the range from 1.482 $\mu$m to 1.492 $\mu$m so that the beams of light may be coupled to the optical fiber 54, and it is required that the wavelengths of beams of light from the units 52(#3 and #4) be included within the range from 1.45 $\mu$m to 1.475 $\mu$m so that the beams of light may be coupled to the optical fiber 54.

If it is tried to provide four laser diodes which satisfy such requirements without application of the present invention, then appropriate laser diodes must be selected from within a large number of laser diodes, and complicated working is required.

Such complicated working is eliminated by application of the present invention. In particular, according to the present invention, since a beam of light having a desired center wavelength irrespective of the spectrum of a light emitting element can be obtained and the spectrum of the beam of light can be made sufficiently narrow by means of a band-reflecting filter (for example, a fiber grating), for example, with the light source apparatus of FIG. 10, even if the characteristics of the laser diodes have some dispersion, beams of light from the units 52(#1, #2, #3 and #4) can be coupled to the optical fiber 54 with a sufficient coupling efficiency.

Figure 12A:
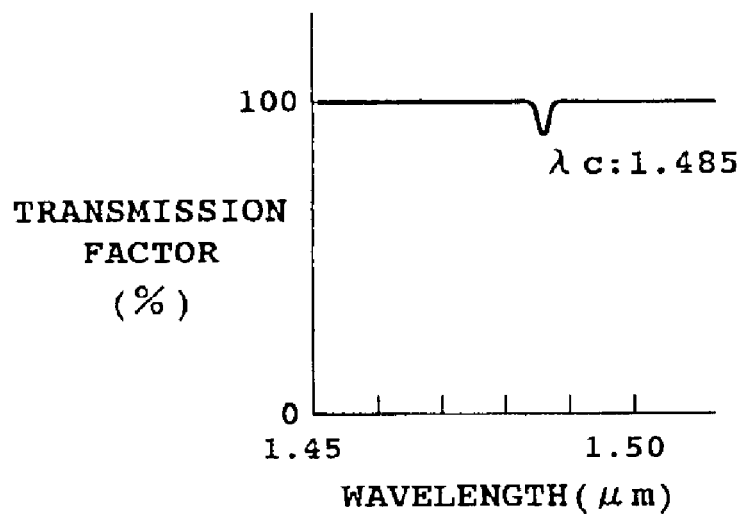
FIGS. 12A and 12B are diagrams illustrating characteristics of a fiber grating of FIG. 10.
Figure 12B:
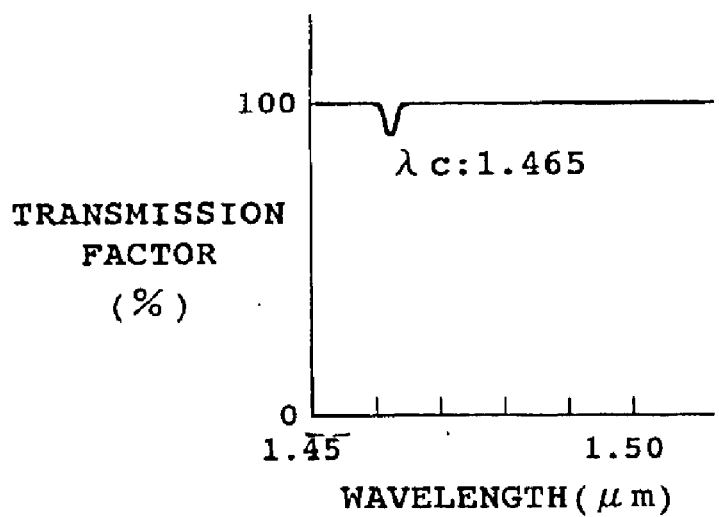

As seen from FIG. 12A, the reflection band of each of the fiber gratings FG11 and FG12 has a center wavelength at 1.485 $\mu$m. Further, as seen from FIG. 12B, the reflection band of each of the fiber gratings FG13 and FG14 has a center wavelength at 1.465 $\mu$m. The full width at half maximum of each of them is 1 nm, and the lowest transmission factor of each of them is 95%.

Operation of the light source apparatus of FIG. 10 is described with reference to FIGS. 13A to 13D. In each of FIGS. 13A to 13D, the axes of ordinate at a left side portion and a right side portion indicate the normalized optical power, and the axis of abscissa indicates the wavelength ($\mu$m).

Figures 1, 13A:
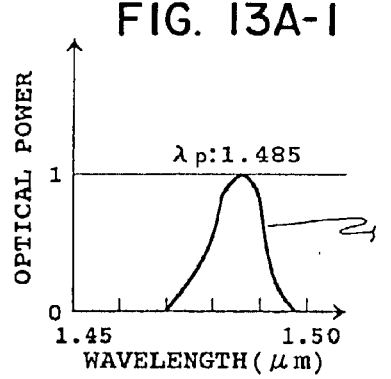
FIGS. 13A to 13D are diagrams illustrating operation of the light source apparatus of FIG. 10.
Figures 2, 13A:
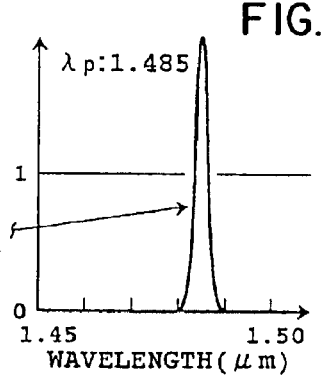

In the spectrum of a beam of light outputted from the laser diode 58 of the unit 52(#1), as seen from the left side portion of FIG. 13A, the wavelength which provides a maximum light power is 1.485 $\mu$m, and the range within which the spectrum is present is the range of the wavelength from 1.470 $\mu$m to 1.498 $\mu$m. Since the fiber grating FG11 has a characteristic illustrated in FIG. 12A, the spectrum of a beam of light obtained from the unit 52(#1) and the fiber grating FG11 is such as shown in the right side portion of FIG. 13A. The normalized maximum optical power of the spectrum exhibits an increase from 1 to almost 2, and also the full width at half maximum of the spectrum exhibits a reduction approximately to 1 nm. The center wavelength of the spectrum is 1.485 $\mu$m.

Figures 1, 13B:
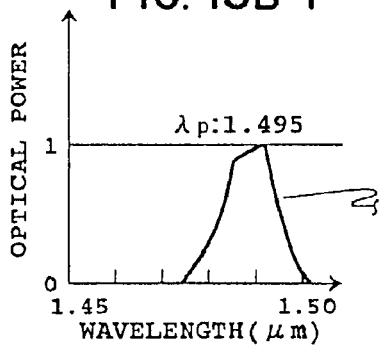
Figures 2, 13B:
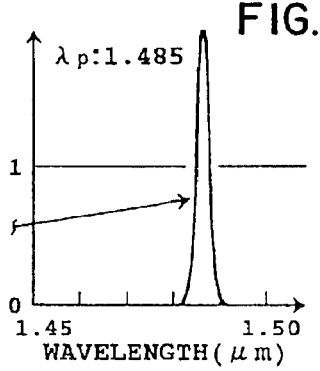

In the spectrum of a beam of light outputted from the laser diode 58 of the unit 52(#2), as shown in the left side portion of FIG. 13B, the wavelength which provides a maximum optical power is 1.495 $\mu$m, and the existing range of the spectrum is the range of the wavelength from 1.476 $\mu$m to 1.502 $\mu$m. Since the fiber grating FG12 has the characteristic shown in FIG. 12A, the spectrum of a beam of light obtained by the unit 52(#2) and the fiber grating FG12 is such as shown in the right side portion of FIG. 13B. The normalized maximum optical power of the spectrum exhibits an increase from 1 to almost 2, and also the full width at half maximum of the spectrum exhibits a reduction approximately to 1 nm. The center wavelength of the spectrum is 1.485 $\mu$m.

Figures 1, 13C:
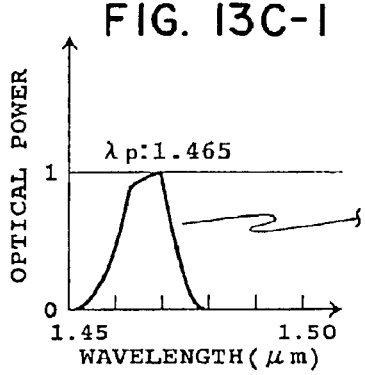
Figures 2, 13C:
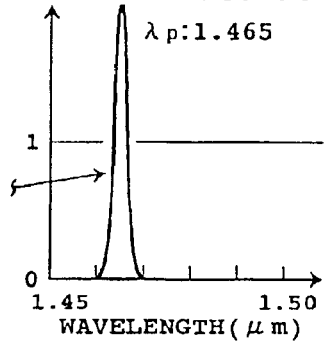

In the spectrum of a beam of light outputted from the laser diode 58 of the unit 52(#3), as shown in the left side portion of FIG. 13C, the wavelength which provides a maximum optical power is 1.465 $\mu$m, and the existing range of the spectrum is the range of the wavelength from 1.452 $\mu$m to 1.478 $\mu$m. Since the fiber grating FG13 has the characteristic shown in FIG. 12B, the spectrum of a beam of light obtained by the unit 52(#3) and the fiber grating FG13 is such as shown in the right side portion of FIG. 13C. The normalized maximum optical power of the spectrum exhibits an increase from 1 to almost 2, and also the full width at half maximum of the spectrum exhibits a reduction approximately to 1 nm. The center wavelength of the spectrum is 1.465 $\mu$m.

Figures 1, 13D:
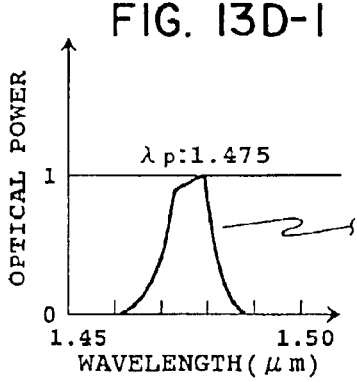
Figures 2, 13D:
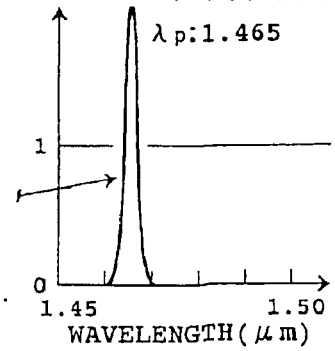

In the spectrum of a beam of light outputted from the laser diode 58 of the unit 52(#4), as shown in the left side portion of FIG. 13D, the wavelength which provides a maximum optical power is 1.475 $\mu$m, and the existing range of the spectrum is the range of the wavelength from 1.461 $\mu$m to 1.486 $\mu$m. Since the fiber grating FG14 has the characteristic shown in FIG. 12B, the spectrum of a beam of light obtained by the unit 52(#4) and the fiber grating FG14 is such as shown in the right side portion of FIG. 13D. The normalized maximum optical power of the spectrum exhibits an increase from 1 to almost 2, and also the full width at half maximum of the spectrum exhibits a reduction approximately to 1 nm. The center wavelength of the spectrum is 1.465 $\mu$m.

FIG. 14 is a diagram illustrating a spectrum of an output beam of the light source apparatus of FIG. 10 to be coupled to the optical fiber 54. Since a beam of light obtained by the unit 52(#1) and the fiber grating FG11 and another beam of light obtained by the unit 52(#2) and the fiber grating FG12 are polarization coupled by the PBS 82, a narrow first spectrum whose center wavelength is 1.485 $\mu$m and whose normalized optical power is approximately 4 is obtained. Further, since a beam of light obtained by the unit 52(#3) and the fiber grating FG13 and another beam obtained by the unit 52(#4) and the fiber grating FG14 are polarization coupled by the PBS 84, a narrow second spectrum whose center frequency is 1.465 $\mu$m and whose normalized light power is approximately 4 is obtained.

Since the first and second spectra satisfy the requirements illustrated in FIGS. 11B and 11A, respectively, the first and second spectra can be wavelength division multiplexed with no loss in principle and coupled to the optical fiber 54 by the WDM coupler 86. Since the first and second spectra remain within the range of the wavelength from 1.45 $\mu$m to 1.50 $\mu$m which is a pumping band suitable for an EDFA, the EDFA can output a higher power by using the light source apparatus of FIG. 10 as a pump light source for the EDFA.

It is to be noted that one or more sets each including two laser diodes which oscillate with a P polarization plane and an S polarization plane and a PBS for polarization coupling them may be provided additionally to further increase the output power.

Figure 15:
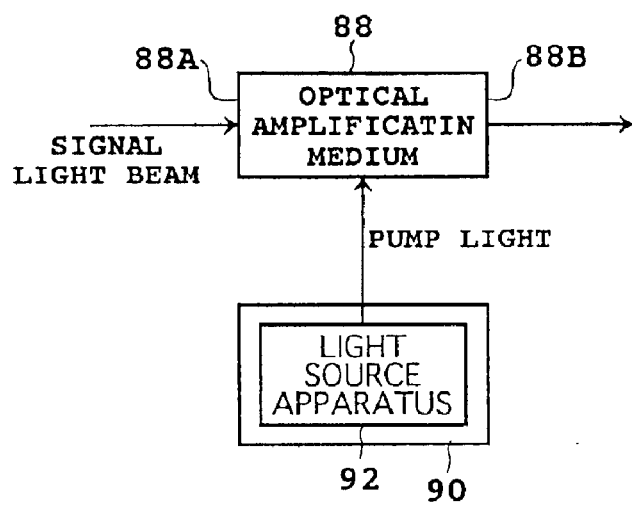
FIG. 15 is a block diagram showing a basic construction of an optical amplifier according to the present invention.

FIG. 15 is a block diagram showing a basic construction of an optical amplifier according to the present invention. The optical amplifier includes an optical amplification medium 88 and a pumping unit 90. The optical amplification medium 88 has a first end 88A and a second end 88B, and a signal light beam is supplied to the optical amplification medium 88 through the first end 88A. The pumping unit 90 pumps the optical amplification medium 88 so that the optical amplification medium 88 may have an amplification band including the wavelength of the signal light beam. The signal light beam amplified in the optical amplification medium 88 is outputted from the second end 88B. The pumping unit 90 may have the basic construction of the light source apparatus according to the present invention shown in FIG. 1 or any of the constructions of the various embodiments of the present invention. An output light beam of a light source apparatus 92 is supplied as pump light to the optical amplification medium 88. The pump light is supplied through one or both of the first end 88A and the second end 88B to the optical amplification medium 88.

In this manner, an optical amplifier having a high output optical power can be provided by using the light source apparatus 92 according to the present invention for pumping of the optical amplification medium 88.

Figure 16:
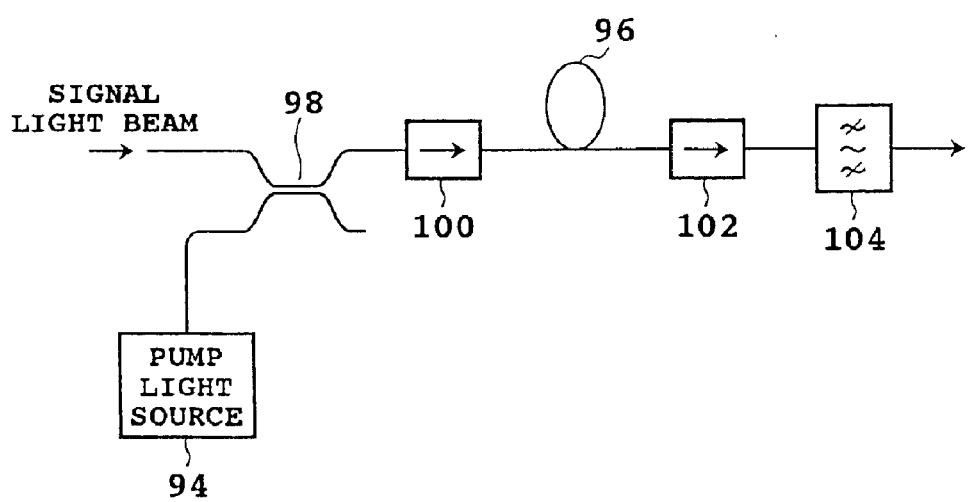
FIG. 16 is a block diagram showing an embodiment of an optical amplifier according to the present invention.

FIG. 16 is a block diagram showing an embodiment of an optical amplifier according to the present invention. The optical amplifier shown adopts, as a pump light source 94, the light source apparatus according to the present invention, particularly the light source apparatus of the fifth embodiment. Further, for the optical amplification medium 88 (refer to FIG. 15), an erbium-doped fiber (EDF) 96 is adopted. A signal light beam to be amplified and a pump light beam from the pump light source 94 are added to each other by an optical coupler 98 and supplied into the EDF 96 through a first end of the EDF 96 via an optical isolator 100. The signal light beam amplified in the EDF 96 successively passes from the second end of the EDF 96 through an optical isolator 102 and an optical band-pass filter 104 and is outputted from the optical amplifier. With the construction just described, the output light power of the optical amplifier can be raised effectively in accordance with the reason described above with reference to FIG. 14.

Where the pump light source 94 has a single laser diode as a light emitting element, the optical output power can be raised effectively by setting the oscillation wavelength of the laser diode to a value in the proximity of 1.48 μm, preferably to a value within the range from 1.45 μm to 1.50 μm.

Figure 17:
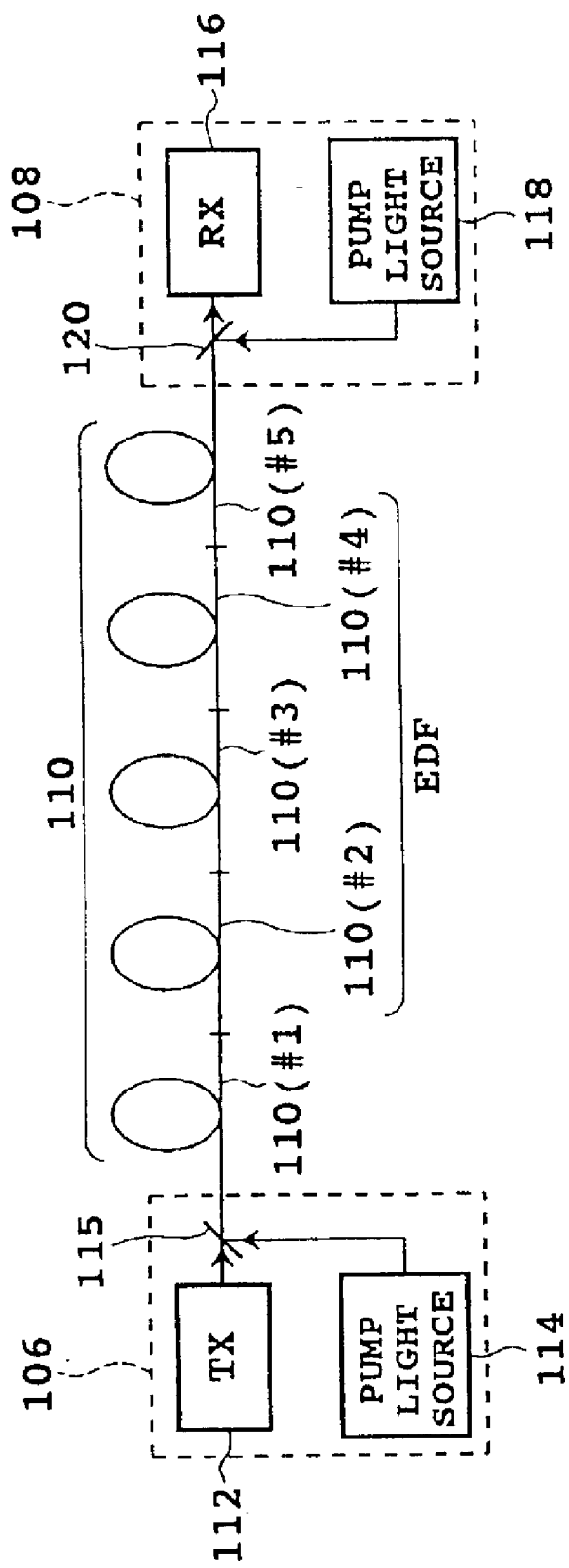
FIG. 17 is a block diagram showing an embodiment of an optical communication system according to the present invention.

FIG. 17 is a block diagram showing an embodiment of an optical communication system according to the present invention. The system shown has a first terminal station 106, a second terminal station 108, and an optical fiber transmission line 110 which interconnects the terminal stations 106 and 108. The first terminal station 106 has an optical transmitter (TX) 112 which outputs an optical signal, and a pump light source 114. The optical transmitter 112 and the pump light source 114 are coupled to the optical fiber transmission line 110 by an optical coupler 115. The second terminal station 108 includes an optical receiver (RX) 116 for receiving an optical signal transmitted by the optical fiber transmission line 110, and a pump light source 118. The optical receiver 116 and the pump light source 118 are coupled to the optical fiber transmission line 110 by an optical coupler 120.

The optical fiber transmission line 110 includes five spans 110(#1, #2, #3, #4 and #5) in order from the first terminal station 106. Particularly in the present embodiment, each of the spans 110(#2 and #4) is an EDF. Connection between adjacent spans is established, for example, by splicing. The length of each of the spans 110(#1 and #5) is, for example, approximately 50 km, and the length of each of the spans 110(#2 and #4) is, for example, approximately 50 m while the length of the span 110(#3) is, for example, 200 km.

For each of the pump light sources 114 and 118, the light source apparatus according to the present invention is used. Each of the light emitting elements of the pump light sources 114 and 118 is one or more laser diodes in order to raise the pumping efficiency, and in order to effectively amplify an optical signal of the wavelength 1.55 μm band, the oscillation wavelength of each laser diode is set to a value in the proximity of 1.48 μm, preferably to a value within the range from 1.45 μm to 1.50 μm.

An optical signal and pump light coupled by the optical coupler 115 arrive at the span 110(#2) while being gradually attenuated in the span 110(#1). In the span 110(#2), the optical signal is amplified, and the amplified optical signal is gradually attenuated in the span 110(#3) until it arrives at the span 110(#4). The pump light from the pump light source 118 passes through the optical coupler 120 and the span 110(#5) in this order and is supplied to the span 110(#4). Accordingly, the optical signal which has been attenuated in the span 110(#3) is amplified by the span 110(#4). The amplified optical signal passes through the span 110(#5) and the optical coupler 120 in this order and is supplied to the optical receiver 116.

With the present embodiment, since an optical signal is amplified in the spans 110(#2 and #4), the length of the optical fiber transmission line 110 for obtaining a required reception sensitivity can be increased. Further, since the pump light sources 114 and 118 which require supply of power are provided in the terminal stations 106 and 108, respectively, where the optical fiber transmission line 110 is laid, for example, on the bottom of the sea, maintenance of the system is facilitated. Further, since the light source apparatus according to the present invention is used for each of the pump light sources 114 and 118, the lengths of the spans 110(#1 to #5) for obtaining a pump light intensity for causing a required amplification to occur in each of the spans 110(#2 and #4) can be increased.

Where an EDF is applied as a component of the optical fiber transmission line 110 in this manner, setting of a power diagram is important. In particular, in order to reduce occurrence of stimulated Brillouin scattering (SBS) in the optical fiber transmission line 110, careful setting of a power diagram is required. For example, only if an EDF is provided in the first terminal station 106, the power of an optical signal becomes excessively high in the EDF, and limitation to the transmission distance by occurrence of SBS is liable to occur. Accordingly, by providing EDFs at a plurality of locations intermediately of the optical fiber transmission line 110 >(in the spans 110(#2 and #4)) as in the present embodiment, the transmission distance can be increased by compensation for the loss of an optical signal and suppression of SBS.

Here, since the span 110(#1) of a suitable length is present between the span 110(#2) and the pump light source 114, the attenuation of an optical signal in the span 110(#1) can be compensated for by amplification of the optical signal principally by forward pumping (the propagation directions of the optical signal and pump signal are same) in the span 110(#2). Further, since, in the span 110(#4), an optical signal is amplified principally by backward pumping (the propagation directions of the optical signal and pump signal are opposite to each other), loss of the optical signal in the spans 110(#3 or #5) can be compensated for by such amplification. Accordingly, the transmission distance can be increased by the spans 110(#1, #2, #4 and #5).

As described above, according to the present invention, an effect is achieved that a light source apparatus by which a light beam having a desired center frequency irrespective of the spectrum of a light emitting element can be obtained can be provided. Further, according to the present invention, another effect is achieved that a light source apparatus by which a beam of light which has a maximum power higher than the maximum power of a beam of light outputted from a light emitting element can be obtained can be provided. Further, according to the present invention, a further effect is achieved that an optical amplifier whose output light power is high can be provided. Further, according to the present invention, a still further effect is achieved that an optical communication system which can compensate for the loss of an optical fiber transmission line and can be maintained readily can be provided.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An apparatus comprising:
a first light source outputting a light beam having a spectrum determined by a gain band;
a second light source outputting a light beam having a spectrum determined by a gain band;
a plurality of filters each having a reflection band included in said gain band; and
an optical switch having first and second input ports for inputting light beams outputted from said first and second light sources, and a plurality of output ports optically connected to said plurality of filters for selectively coupling said plurality of output ports to one of said first and second input ports; and
a control unit to control the selective coupling of said plurality of output ports to one of said first and second input ports according to status of said first and second light sources,
wherein said first and second light sources provide pumping light to a single transmission line.

2. An apparatus according to claim 1, wherein the plurality of filters each comprises a fiber grating.

3. An apparatus according to claim 1, wherein said first and second light sources comprise laser diodes.

4. An apparatus according to claim 1, wherein the reflection bands are different from each other.

5. An apparatus according to claim 1, wherein
said apparatus further comprises a second optical switch having a plurality of input ports connected respectively to said plurality of filters, and an output port connected to said single transmission line, and
for the second optical switch, said control unit controls a selective coupling of said output port to said plurality of input ports.

6. An apparatus comprising:
a first light source outputting a light beam having a wavelength band;
a second light source outputting a light beam having a wavelength band;
a plurality of filters each having a reflection band included in the wavelength band;
an optical switch having inputs connected respectively to the first and second light sources and outputs connected respectively to the plurality of filters, for selectively coupling at least one of the inputs to at least one of the outputs; and
a coupler to couple the plurality of filters with a single transmission line such that at least one of the first and second light sources provide pumping light to the transmission line.

7. An apparatus according to claim 6, wherein the optical switch only couples one input to one output.

8. An apparatus according to claim 6, wherein the plurality of filters relate to a plurality of different reflection bands.

9. An apparatus according to claim 6, wherein the first and second light sources have the same wavelength band.

10. An apparatus according to claim 6, wherein the coupler is a downstream switch having inputs connected respectively to the plurality of filters and an output connected to the single transmission line, to selectively couple one of the inputs to the output.

11. An apparatus according to claim 10, wherein
a single control unit controls both the optical switch and the downstream switch, and
the control unit controls the optical switch and the downstream switch based on a state of the first and/or second light source.

12. An apparatus according to claim 6, further comprising:
a control unit to control inputs/output switching in the optical switch, based on a state of at least one of the first and second light sources.

13. An apparatus according to claim 6, wherein
both the first and second light sources are pumping light sources, and
the second light source serves as a backup to the first light source.

* * * * *